(12) United States Patent
Fu et al.

(10) Patent No.: US 9,973,561 B2
(45) Date of Patent: May 15, 2018

(54) CONFERENCING BASED ON PORTABLE MULTIFUNCTION DEVICES

(71) Applicant: International Business Machines Corporation, Armonk, NY (US)

(72) Inventors: Yu Hui Fu, Beijing (CN); Yu Hang Liu, Beijing (CN); Ning Sun, Beijing (CN); Ming Xie, Beijing (CN); Jian Xu, Beijing (CN); Li Li Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 14/689,069

(22) Filed: Apr. 17, 2015

(65) Prior Publication Data

US 2016/0308929 A1    Oct. 20, 2016

(51) Int. Cl.
*G06F 15/16* (2006.01)
*H04L 29/06* (2006.01)

(52) U.S. Cl.
CPC .......... *H04L 65/605* (2013.01); *H04L 65/403* (2013.01)

(58) Field of Classification Search
CPC ............................. H04L 65/403; H04L 65/605
USPC ....... 709/201, 202, 203, 204, 205, 217, 230, 709/231, 232, 246
See application file for complete search history.

(56) References Cited

U.S. PATENT DOCUMENTS

| | | | | |
|---|---|---|---|---|
| 6,536,553 B1* | 3/2003 | Scanlon | ............... | G01N 29/069 181/108 |
| 7,957,771 B2 | 6/2011 | Frerking et al. | | |
| 8,582,789 B2* | 11/2013 | Cheung | .................... | H04S 1/00 381/313 |
| 8,606,249 B1 | 12/2013 | Goodwin | | |
| 8,718,797 B1* | 5/2014 | Addepalli | ............. | H04W 4/046 700/17 |
| 2004/0059571 A1* | 3/2004 | Ohtomo | ................ | H04M 9/082 704/226 |
| 2007/0276270 A1* | 11/2007 | Tran | ..................... | A61B 5/0022 600/508 |
| 2008/0294019 A1* | 11/2008 | Tran | ..................... | A61B 5/0006 600/301 |
| 2009/0296972 A1* | 12/2009 | Inoda | ..................... | H04R 3/005 381/361 |
| 2012/0058754 A1 | 3/2012 | Couse et al. | | |

(Continued)

FOREIGN PATENT DOCUMENTS

CN    203537386 U    4/2014
EP    2547060 B1    6/2014

OTHER PUBLICATIONS

Authors et al., "A Method to leverage big room tele-conference with mobile devices," IP.com No. 000237769, Jul. 10, 2014, 4 pages.

(Continued)

*Primary Examiner* — Davoud Zand
(74) *Attorney, Agent, or Firm* — David Zwick

(57) ABSTRACT

A computer receives a first audio signal that is acquired by a first user device used by a first user in a conference and a second audio signal that is acquired by a second user device used by a second user in the conference. The computer processes the first audio signal based on the second audio signal to improve quality of the first audio signal, and sends the processed first audio signal to the conference.

20 Claims, 5 Drawing Sheets

(56) References Cited

U.S. PATENT DOCUMENTS

| | | | |
|---|---|---|---|
| 2012/0062729 A1* | 3/2012 | Hart | G06F 1/1626 |
| | | | 348/135 |
| 2012/0308044 A1* | 12/2012 | Vander Mey | H04L 12/1822 |
| | | | 381/104 |
| 2014/0194059 A1 | 7/2014 | Milosevski et al. | |
| 2015/0068069 A1* | 3/2015 | Tran | H04B 1/385 |
| | | | 36/136 |
| 2016/0189726 A1* | 6/2016 | Raniwala | G10L 21/02 |
| | | | 704/227 |
| 2016/0287166 A1* | 10/2016 | Tran | H04B 1/3827 |
| 2017/0150255 A1* | 5/2017 | Wang | H04R 3/005 |

OTHER PUBLICATIONS

Authors et al., "A method and system to make voice transmitted into conference line clearly," IP.com No. 000236611, May 6, 2014, 6 pages.

* cited by examiner

CONFERENCING BASED ON PORTABLE MULTIFUNCTION DEVICES

BACKGROUND

The present disclosure relates generally to speech signal processing and more particularly to conferencing on portable multifunction devices.

Teleconferencing is an essential and indispensable part of today's communication. It is a very cost effective alternative to face-to-face meetings and allows for bringing people together regardless of locations to exchange ideas in real time and in an interactive manner. A teleconference refers to a live exchange and mass articulation of information among two or more people who are remote from one another, but linked by a telecommunication system. Various telecommunication systems may be used for teleconferencing. Examples include, but are not limited to, telephone systems, Voice over Internet Protocol (VoIP) systems, and other like systems. Teleconferencing may include video conferencing, audio streaming, and other types of interactive exchanges that include an audio component.

In a typical teleconference, a party may have voice interactions with one or more other parties via a conference hub device including a speakerphone or microphone. For the sake of discussion, in the context of this disclosure, the terms "speakerphone" and "microphone" can be used interchangeably. A party in the teleconference may be a single participant or a group of participants gathered in the same location. For a relatively small teleconference, when there are multiple participants in a party, these participants may get closer to the speakerphone to make their voice clear. In a large teleconference, multiple speakerphones may be arranged according to the locations of the participants. Or, alternatively, a person(s) may be assigned to deliver the speakerphone to different speakers. The similar problem exists in a conventional conference where a speaker needs a microphone to make a speech.

SUMMARY

Embodiments of the present invention disclose a method, computer program product, and system for facilitating conferences. A computer receives a first audio signal that is acquired by a first user device used by a first user in a conference and a second audio signal that is acquired by a second user device used by a second user in the conference. The computer processes the first audio signal based on the second audio signal to improve quality of the first audio signal, and sends the processed first audio signal to the conference.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Throughout the drawings, same or similar reference numerals represent the same or similar element.

DETAILED DESCRIPTION

Various embodiments of the present invention will now be described. It is to be understood that these embodiments are described only for the purpose of illustration to help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
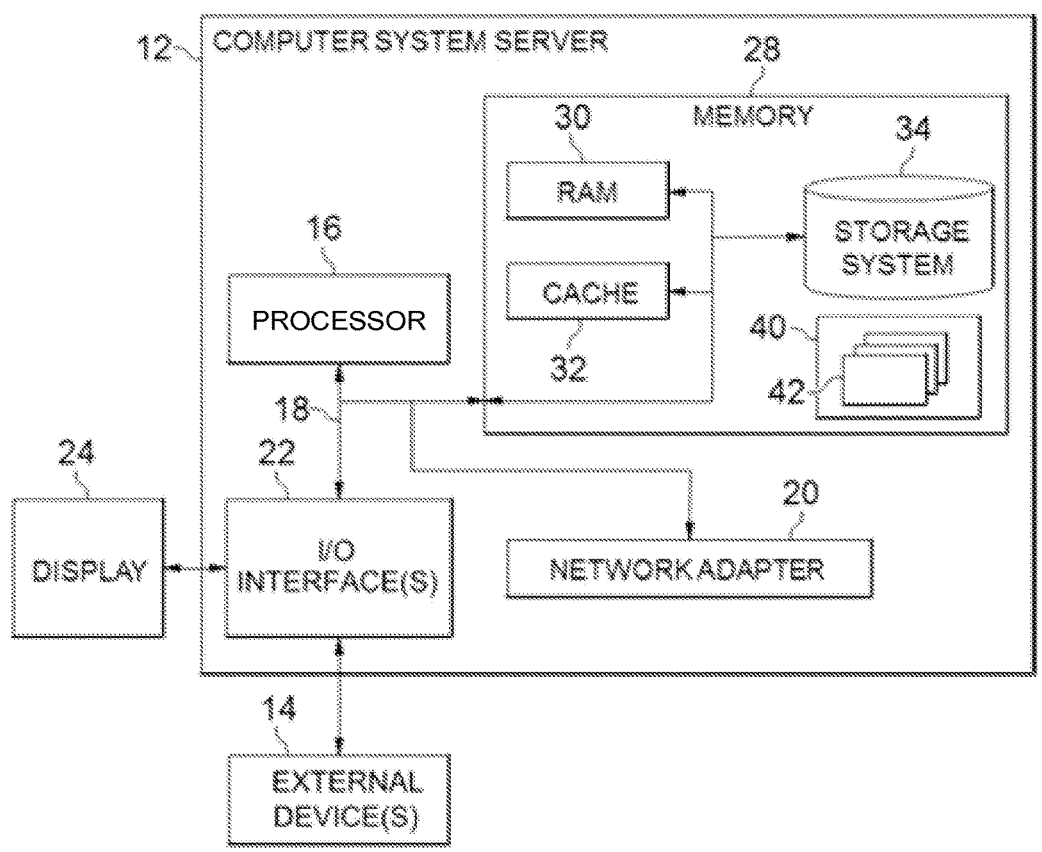
FIG. 1 is a block diagram of an electronic device in which embodiments of the present invention may be implemented.

Reference is first made to FIG. 1, a block diagram of an exemplary electronic device or computer system/server 12 in which embodiments of the present invention may be implemented. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules 42 that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, and a display 24 that enable a user to interact with computer system/server 12, as well as any devices (e.g., network card, modem, etc.) that enable computer system/server 12 to communicate with one or more other computing devices. Such communication can occur via Input/Output (I/O) interfaces 22. In addition, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

In various embodiments, computer system/server 12 may be a mobile device, including, but not limited to, mobile phones, laptop computers, handheld computing devices, tablet computers, personal digital assistances (PDAs), wearable devices like electronic glasses and watches. In other embodiments, the computer system/server 12 may be a fixed device, such as a personal computer (PC). Although some embodiments will be discussed with reference to a mobile electronic device in the following, this is only for the purpose of illustration without suggesting any limitations as to scope of use or functionality of the present invention.

In computer system/server 12, I/O interfaces 22 may support one or more of various different input devices that can be used to provide input to computer system/server 12. For example, the input device(s) may include a user device such keyboard, keypad, touch pad, trackball, etc. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
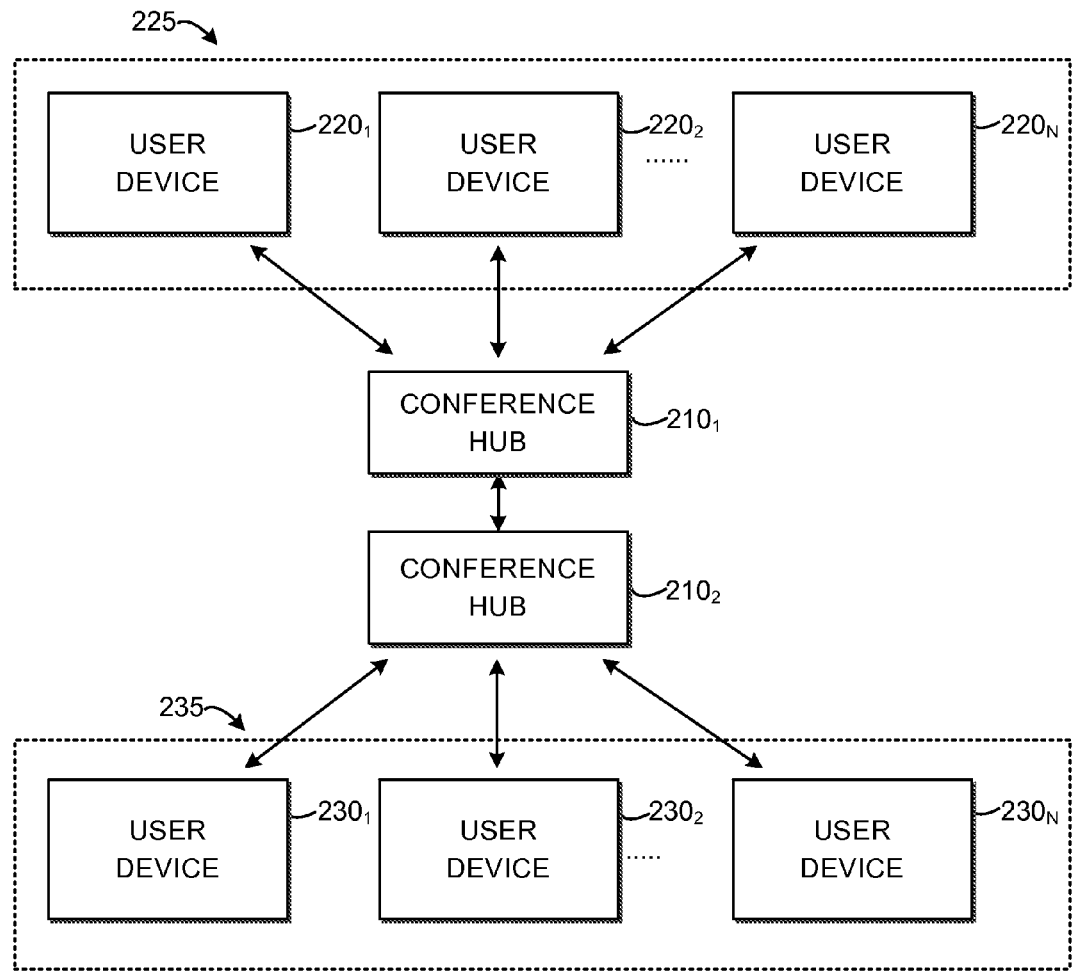
FIG. 2 is a block diagram of an environment in which embodiments of the present invention may be implemented.

FIG. 2 is a block diagram of an environment in which embodiments of the present invention may be implemented. In various embodiments of the present invention, the participants of a conference may use their own devices, such as mobile phones, tablet computers, or any other portable or fixed multifunction devices, to speak to other conference participants without relying on the dedicated speakerphones. As used herein, the term "conference" may refer to either a teleconference or a conventional face-to-face conference. For example, the microphones provided on user devices may be used to capture the audio signals representing the voices of respective users on those devices. The captured, or acquired, audio signals may be transmitted to a hub, such as a conference hub, which in turn processes and sends the audio signals to other participants in the conference. In various embodiments, the conference hub may improve the quality of the received audio signals by adaptively cancelling the noise in the dominant speaker's audio signals, discussed in more detail below. As a result, the flexibility, audio quality and extensibility of the teleconference can be improved in a cost effective way.

Only for the purpose of discussion, in the following paragraphs, some example embodiments will be discussed with reference to a teleconference environment. However, embodiments of the present invention also apply to other use scenarios such as a conference held in a meeting room. The scope of the present invention is not limited in this regard.

As shown in FIG. 2, the teleconference environment includes conference hubs 2101 and 2102 (collectively referred to as "conference hub 210"). Although only two conference hubs 210 are shown, the number of conference hubs 210 is not limited thereto. The conference hubs 210 may be operable to initiate, manage and terminate teleconferences among two or more parties. In certain embodiments, for example, the conference hubs 210 may be computer 12 as discussed above with reference to FIG. 1. It is to be understood that depending on the specific application and requirement, some components as shown in FIG. 1 can be omitted. For example, in some embodiments, a conference hub 210 may not include the cache 32, the external device 14 and/or other components. Exemplary embodiments of the conference hub 210 will be discussed below, with reference to FIG. 5.

In accordance with embodiments of the present invention, the conference hub 2101 serves a party 225 in the teleconference and the conference hub 2102 serves another party 235. Generally speaking, each conference hub 210 is located in the same physical space as the participants of the served party 225, 235. Different conference hubs 210 may be located remotely to one another and may communicate via any suitable wired or wireless links.

In operation, each conference hub 210 may receive audio signals that are acquired by the user devices used by the participants belonging to the associated party, process the received audio signals, and transmit the processed audio signal of the current speaker to one or more other conference hubs 210 serving one or more other parties 225, 235 in the teleconference. It is to be understood that in addition to the audio signals, in some embodiments, the conference hubs 210 may receive, process and/or transmit other types of signals such as videos, and textual information.

As shown, there are one or more user devices, such as portable multifunction devices 2201, 2202 . . . 220N (collectively referred to as "portable multifunction devices 220.") The users of these portable multifunction devices 220 together form the party 225. In accordance with embodiments of the present invention, the participants in the party 225 may use their portable multifunction devices 220 to have voice interaction with the participants in one or more other parties via the conference hub 210. Likewise, the participants of the party 235 may use their user devices, such as portable multifunction devices 2301, 2302 . . . 230N (collectively referred to as "portable multifunction devices 230") to communicate with the users in the party 225 and other parties (if any).

The user devices 220, 230 may be any suitable electronic devices that are capable of capturing, recording or otherwise acquiring the audio signals. Examples of the user devices include, but are not limited to, mobile phones, smart phones, tablet computers, laptop computers, personal digital assistances (PDAs), and wearable electronic devices such as digital glasses or watches, and headphones. In the following discussions, the portable multifunction devices will be described as examples of the user devices. However, it is to be understood that any other types of electronic devices, either portable or fixed, can be used to implement the embodiments of the present invention. Specifically, in the context of this disclosure, a single-purpose speakerphone is not considered as a multifunction device.

As mentioned above, in a conventional teleconferencing system, the participants have to rely on the dedicated speakerphone(s), for example, provided on the conference hub 210. Such conventional teleconferencing often suffers from the poor quality of the audio signals, particularly when multiple participants on one end share the same speakerphone. Some teleconferencing systems provide multiple microphones and multidirectional microphones. However, such systems tend to be expensive and their microphones lack mobility. Moreover, the participants in a typical teleconference are often located at different distances from the shared speakerphone and would probably move, for example, to approach a white board. These distances and the mobility of speakers significantly impact the audio quality presented to participants listening to the conference.

Contrary to the conventional teleconferencing systems, and in view of the fact that many people nowadays have mobile phones and/or other portable or fixed devices equipped with speakerphones and various communication systems, exemplary embodiments of the present invention allow the users to use their own portable multifunction devices 220, 230 to acquire the audio signals. More specifically, in accordance with embodiments of the present invention, instead of using a shared speakerphone, the speakerphones or microphones provided on the portable multifunction devices 220, 230 may be utilized to acquire the audio signals representing speech of its user's voice. That is, during the teleconference, any participant may speak to his/her own portable multifunction device 220, 230 and the portable multifunction device 220, 230 may acquire and transmit the audio signal representing the user's voice to the conference hub 210, which in turn may process the received audio signal and transmit the processed signal to the plurality of conference hubs 210 in the conference. The conference hubs 210 may play the received, processed audio signal to the users in the party 225, 235 served by those conference hubs 210.

As used herein, the term "speakerphone" or "microphone" refers to an acoustic-to-electric transducer or sensor that converts sound in air into an electrical signal. A speakerphone may use electromagnetic induction, capacitance change or piezoelectricity to produce an electrical signal from air pressure variations. As mentioned above, the terms "speakerphone" and "microphone" may be used interchangeably.

In various embodiments, the audio signals acquired by the portable multifunction devices 220, 230 may be delivered to the conference hubs 210 in real time. For example, in certain embodiments, the audio signals may be streamed from the portable multifunction devices 220, 230 to the conference hub 210. In other embodiments, the audio signals acquired by the portable multifunction devices 220, 230 may be delivered to the conference hub 210 in a row format. Alternatively, in other embodiments, the audio signals may be processed before being transmitted to the conference hub 210. For example, a preamplifier may be connected to the speakerphone to process the audio signal before the signal is amplified with an audio power amplifier. Additionally or alternatively, the portable multifunction device 220, 230 may convert the audio signals into digital signals, for example, by an analog-to-digital converter.

The conference hub 210 may support bi-directional communications with the portable multifunction devices 220, 230. The audio signals and/or other information may be communicated between the conference hub 210 and the portable multifunction devices 220, 230 via any suitable communication links. For example, one or more of portable multifunction devices 220, 230 may communicate with the conference hub 210 according to wireless fidelity (WiFi), Bluetooth, infrared and/or other types of communication protocols. It is to be understood that these examples are described only for the purpose of illustration, without suggesting any limitations as to the scope of the present invention. The portable multifunction devices 220, 230 may communicate with the conference hub 210 via any additional or alternative wireless and/or wired links.

Particularly, in some embodiments, one or more of the portable multifunction devices 220, 230 may include Near Field Communication (NFC) modules. In such embodiments, the conference hub 210 may be equipped with an NFC module. A NFC module may be circuitry, chip, System-on-Chip (SoC) or firmware that supports the communication of NFC signals. In such embodiments, the teleconferencing system may authenticate the portable multifunction devices 220, 230 by means of the NFC communication, which will be discussed in further detail below.

Upon receipt of the audio signals from the portable multifunction devices 220, 230, the conference hub 210 may process the received audio signal before sending the audio signals to the other parties of the teleconference. The conference hub 210 may improve the quality of the audio signal representing the voice of the current dominant speaker. This may be done, at least in part, based on the audio signals received from one or more other portable multifunction devices 220, 230 located in the same acoustic space as the current dominant speaker.

The functionalities and operations of the conference hub 210 will now be described with reference to FIG. 3, a flowchart 300 of teleconference signal enhancement, in accordance with embodiments of the present invention. In various embodiments, the conference hub 210 may include a software module, a hardware module, a firmware module or any combination thereof.

As shown, teleconference signal enhancement begins, at 310, where an audio signal is received from a portable multifunction device 220, 230 used in a conference. The audio signal received, at 310, is hereinafter referred to as the "first audio signal," the portable multifunction device 220, 230 that acquires and transmits the first audio signal is hereinafter referred to as the "first portable multifunction device," and the user who uses the first portable multifunction device is hereinafter referred to as the "first user." In the exemplary embodiment, the first user is the current speaker in the teleconference.

The first portable multifunction device may acquire the first audio signal by means of the microphone provided thereon. If the first portable multifunction device includes multiple microphones, one of the microphones may be selected to capture the audio signal. In some embodiments, the selection may be made, for example, based on the quality of the audio signal and/or the distances from the microphones to the user's mouth. Alternatively, in some embodiments, the first portable multifunction device may use more than one microphone to acquire the audio signal of the first user. The acquired audio signals may be combined to generate the first audio signal for transmission to the conference hub 210.

The conference hub 210 may receive the first audio signal from the first portable multifunction device via any suitable communication link. Examples of the communication link between the conference hub 210 and the first portable multifunction device include, but are not limited to, WiFi, Bluetooth, Infrared and/or any other suitable communication links, as described above.

In some embodiments, prior to receiving the first audio signal, the conference hub 210 may authenticate the first portable multifunction device to verify the first portable multifunction device is allowed to access the teleconference. In certain embodiments, the authentication may be performed by means of the NFC communications between the conference hub 210 and the first portable multifunction device. In operation, the first user may put the first portable multifunction device in the proximity of the conference hub 210. The first portable multifunction device may then transmit, to the conference hub 210, an NFC signal which, among other things, contains an identification of the first portable multifunction device. By way of example, the identification may be a code, digit, string or any combination thereof that is specific to the first portable multifunction device. With the identification, the conference hub 210 may verify the first portable multifunction device has been registered and authorized to access to the teleconference. In this way, the authentication and access procedure can be performed in an efficient and effective way, without increasing the user's burden.

Of course, it is to be understood that the authentication does not need to be done using the NFC communication. Alternatively or additionally, the first portable multifunction device may transmit its identification to the conference hub 210 in any other suitable way. In certain embodiments, the first portable multifunction device may access the teleconference without any authentication.

At 320, the conference hub 210 may receive audio signals from one or more portable multifunction devices 220, 230 other than the first portable multifunction device. Each of the audio signals received, at 320, is hereinafter referred to as the "second audio signal," each of the portable multifunction devices 220, 230 that acquires and transmits the second audio signal is hereinafter referred to as the "second portable multifunction device," and the user who uses a second portable multifunction device is hereinafter referred to as the "second user."

In some embodiments, the first and second portable multifunction devices are located in the same acoustic space (for example, a meeting room.) That is to say, the first and second users belong to the same party 225, 235 in the teleconference. In some embodiments, similar to the authentication of the first portable multifunction device, the conference hub 210 may authenticate one or more of the second portable multifunction devices, for example, by means of the NFC before receiving the second audio signals.

Alternatively, the second user may belong to another party 225, 235 in the teleconference. That is, the first and second users may be remotely located. For example, in various embodiments, the voice of the dominant speaker may be broadcast in the conference, for example, via a loudspeaker. In this embodiment, the second portable multifunction device(s) may be configured to recognize the relative positions of multiple sound sources and only acquire the audio signals from the nearest sound source. In this way, the second portable multifunction device may only transmit the voice from its user to the conference hub 210 for estimating the ambient noise, and the first user's voice played by the loudspeaker will not be transmitted back to the conference hub 210, thereby avoiding any potential interference.

It is to be understood that although some embodiments will be described with reference to one second portable multifunction device, it is merely for the purpose of illustration without suggesting any limitation as to the scope of the invention. The conference hub 210 may receive the second audio signals from a plurality of second portable multifunction devices. In addition, although the second audio signal is shown to be received after the first audio signal, this is merely for the purpose of illustration. The second audio signal may be received before, after, or concurrently with the first audio signal.

At 330, the first audio signal received, at 310, is processed, at least in part, based on the second audio signal(s) received, at 320, in order to improve the quality of the first audio signal.

As discussed above, the first user is the current speaker in the exemplary teleconference. In some embodiments, the conference hub 210 may be required to identify the first audio signal from the first user from among the plurality of received audio signals. In other words, the conference hub 210 may recognize the dominant speaker at any given instance in time.

In certain embodiments, the conference hub 210 may recognize the dominant speaker based on the strength of the received audio signals. For example, the audio signal with the maximum strength may be determined to be the first audio signal acquired by the first portable multifunction device of the first user who is now the speaker. In certain embodiments, the strength of an audio signal may be measured by the loudness, pitch, sound pressure level (SPL) and/or any other metrics of the audio signal.

Instead of automatically identifying the dominant speaker, in some alternative embodiments, the speaker may indicate his/her identity to the conference hub 210 before speaking. For example, the first user may use the first portable multifunction device to send a special signal or message, such that the conference hub 210 realizes that the first user will become the speaker. Alternatively, the speaker may directly operate the conference hub 210 to input his/her identity.

In accordance with embodiments of the present invention, at 330, the conference hub 210 may reduce the noise in the first audio signal. It should be appreciated that the first user's speech usually suffers from noises in the environment. For example, when the first user is speaking, another user(s) may speak or otherwise make a sound. Even if all the other users in the same party are quiet when the first user is speaking, the voice of the first user may be captured by other portable multifunction devices 220, 230 located in the same acoustic space, especially when the participants sit close to each other. In this embodiment, a plurality of portable multifunction devices 220, 230 may transmit, to the conference hub 210, the audio signals containing the first user's voice. These signals may arrive at the conference hub 210 with varying delays. If the conference hub 210 directly transmits the received audio signals to another party 225, 235, the audio quality will be decreased due, for example, to the echo. Unfortunately, this kind of noise is hard to remove by local processing at the portable multifunction device 220, 230.

In accordance with embodiments of the present invention, this problem may be solved by adaptive noise cancellation at the conference hub 210. In various embodiments, the conference hub 210 may use the second audio signal(s) received, at 320, to estimate the ambient noise in the environment where the first user is located and remove it from the first audio signal, thereby improving the quality of the first audio signal.

Figure 4:
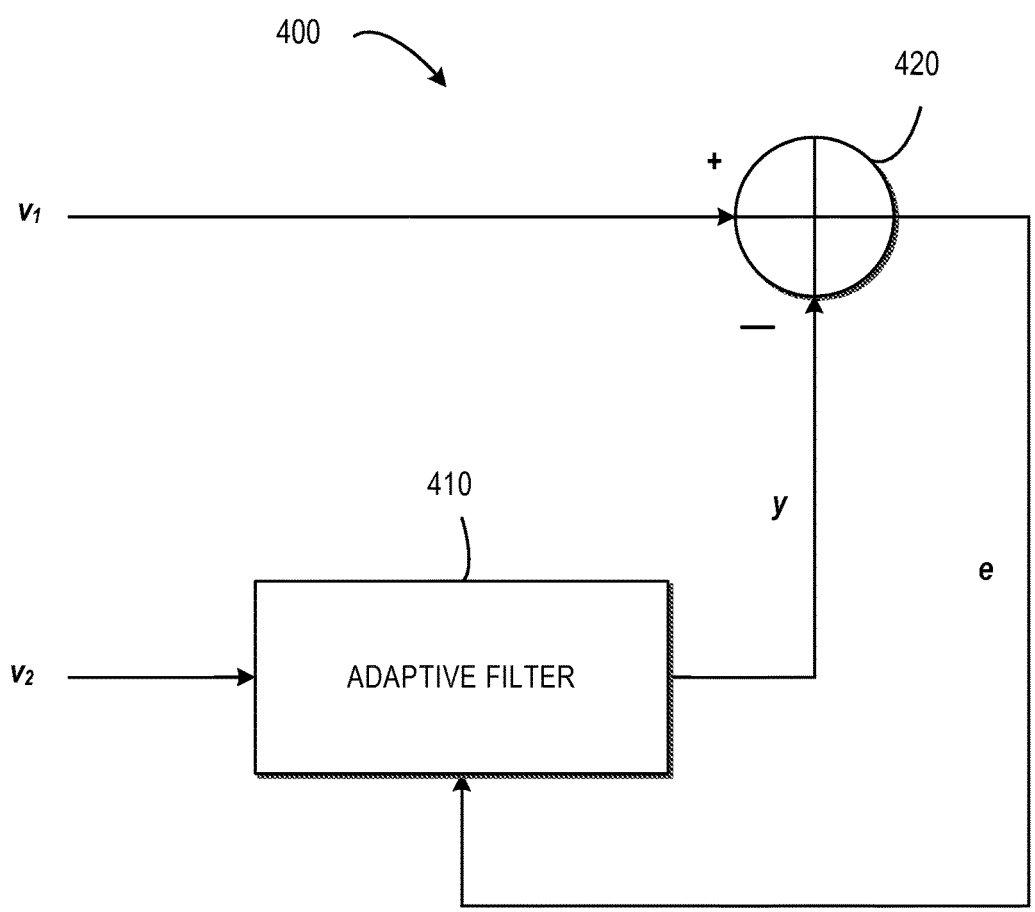
FIG. 4 is a block diagram of a filtering module for adaptive noise cancellation, in accordance with embodiments of the present invention.

FIG. 4 is a block diagram of a filtering module 400 for adaptive noise cancellation, in accordance with embodiments of the present invention. In the exemplary embodiment, the conference hub 210 feeds the second audio signal (denoted as $v_2$) into an adaptive filter 410. The adaptive filter 410 may apply signal filtering on the second audio signal to generate an output audio signal (denoted as y). The output audio signal y may be an approximation of the ambient noise in the first audio signal (denoted as $v_1$). Estimator 420 may calculate an error signal (denoted as e) of the first user's voice, which may be the useful component in the first audio signal $v_1$. The error signal e may be between the first audio signal $v_1$ and the output audio signal y, generated by adaptive filter 410.

As shown in FIG. 4, the error signal e is fed back into the adaptive filter 410 to control the filtering of the second audio signal $v_2$. A variety of criteria may be adopted to control the operation of the adaptive filter 410. By way of example, in one embodiment, the filtering of the second audio signal $v_2$ may be controlled according to the minimum mean square error (MMSE) criterion. In this embodiment, the coefficients of the adaptive filter 410 may be adapted such that the mean square of the error signal e is minimized. It is to be understood that MMSE is just an example, without suggesting any limitations as to the scope of the present invention. Alternatively or additionally, in other embodiments, it is possible to control the filtering of the second audio signal according to any other suitable criteria such as the least squares (LS), maximum signal-noise-ratio (Max-SINR), and linearly constrained minimum variance (LCMV).

In this way, while the first user is speaking, the ambient noise in the acoustic space can be adaptively estimated based on the audio signals received from other portable multifunction devices 220, 230 in the same acoustic space. By removing the estimated noise from the first audio signal, the interferences caused by the other participants in the same party 225, 235 and their portable multifunction devices 220, 230 may be effectively eliminated. As a result, the signal quality from the current dominant speaker can be improved.

In some embodiments, it is possible to apply any other suitable processing to improve the quality of the audio signal. For example, in certain embodiments, the portable multifunction devices 220, 230 may obtain or learn the acoustic features of their user's voices from the captured audio signals. This may be possible when the portable multifunction devices 220, 230 are dedicated to their respective users. The acoustic features of a user may indicate the voice characteristics of that user or the way that user sounds. Examples of the acoustic features may include, but are not limited to, sound direction/position, diffusiveness, direct-to-reverberant ratio (DRR), harmonicity, pitch and pitch fluctuation, saliency/partial loudness/strength, and repetitiveness. Any suitable approaches, either currently known or to be developed in the future, may be used to obtain the acoustic features of a user's voice.

One or more of the acoustic features may be used to facilitate the processing of the first audio signal $v_1$. With such acoustic features, it may be possible to recognize and extract the user's voice from the acquired audio signal in a more precise way, thereby reducing or eliminating the noise accurately. In certain embodiments, the first portable multifunction device may locally filter the acquired audio signal based on the obtained acoustic features in order to recognize which part of the acquired audio signal most likely belongs to the voice of the user. The recognized part may be transmitted to the conference hub 210 as the first audio signal for further processing, with the other parts filtered out.

Alternatively, in consideration of the relatively limited capability and capacity of the portable multifunction device 220, 230, the first portable multifunction device may transmit one or more of the obtained acoustic features to the conference hub 210 for processing. The acoustic features may be organized in any suitable format and sent to the conference hub 210. The conference hub 210 may extract the acoustic features from the received information and use the extracted acoustic features to process the first audio signal.

Particularly, in some embodiments, the acoustic features of the first user may be used in combination with the second audio signal(s) in processing the first audio signal. For example, the conference hub 210 may use the acoustic features to determine which part of the received first audio signal is likely to represent the voice of the first user. By way of example, in the embodiments discussed above with reference to FIG. 4, the acoustic features may be used by the conference hub 210 to determine the useful signal components in the first audio signal which are corresponding to the first user's voice. Accordingly, the other components of the first audio signal will be identified as the ambient noise to be estimated.

By making use of the personalized information that is specific to the individual users, the noise cancellation can be done more adaptively and effectively. Of course, it is to be understood that the acoustic features of the first user may not necessarily be used in combination with the second audio signal. In some alternative embodiments, the acoustic features may be used independently to enhance the voice of the first user.

Figure 3:
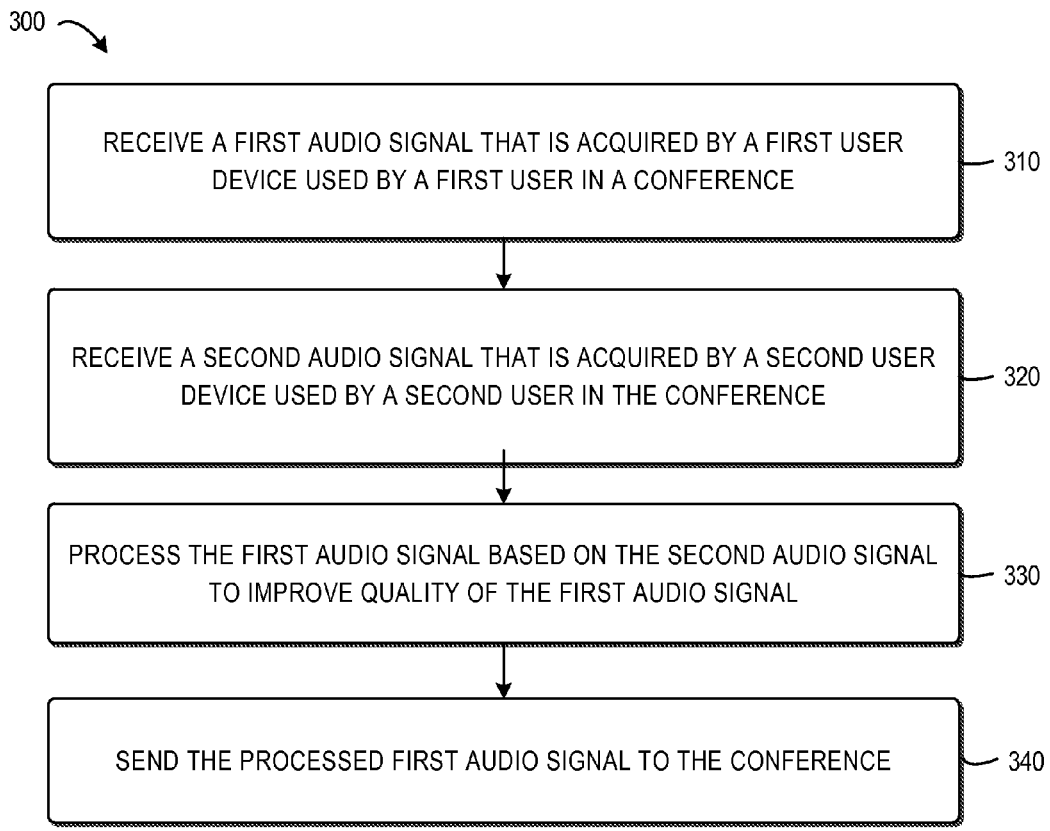
FIG. 3 is a flowchart of teleconference signal enhancement, in accordance with embodiments of the present invention.

With continuing reference to FIG. 3, at 340, the processed first audio signal is sent to the conference. For example, in a teleconference, the conference hub 210 may transmit the processed first audio signal to a remote conference hub 210 serving another party 225, 235 in the conference. In a face-to-face conference, the conference hub 210 may play back the speaker's voice via a loudspeaker.

In accordance with embodiments of the present invention, a participant may freely speak in the teleconference using his/her own device. As such, the need for a dedicated speakerphone(s) may be eliminated and the flexibility, ease of use and scalability of the teleconferencing system may be increased. In addition, the conference hub 210 may implement adaptive noise cancellation where the audio signals from the portable multifunction devices 220, 230 of the participants other than the current speaker are used to adaptively estimate the ambient noise. In this way, the quality of the audio signals may be improved.

Figure 5:
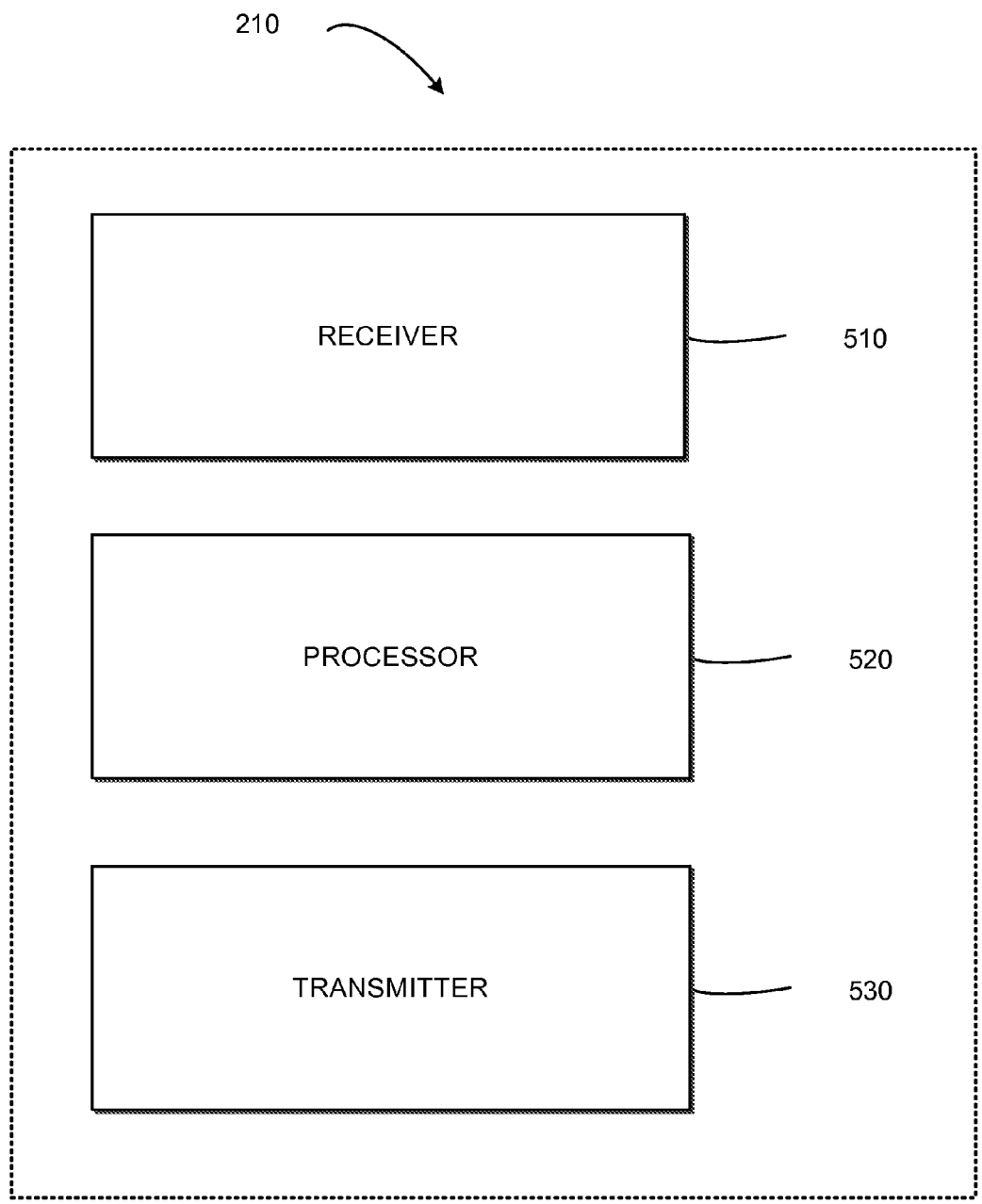
FIG. 5 is a block diagram of a conference hub, in accordance with an embodiment of the present invention.

The conference hub 210 may be implemented in various ways, including as computer 12 (FIG. 1). FIG. 5 is a block diagram of a conference hub 210, in accordance with an embodiment of the present invention. The exemplary conference hub 210 includes a receiver 510 configured to receive a first audio signal that is acquired by a first portable multifunction device 220, 230, or first user device, used by a first user and to receive a second audio signal that is acquired by a second portable multifunction device 220, 230, or second user device, used by a second user, where the first and second users are participants of a conference.

The conference hub 210 further includes a processor 520 configured to process the first audio signal based on the second audio signal to improve quality of the first audio signal. The processor 520 may be any suitable processing unit such as micro-processor or micro-controller of general purpose or special purpose.

The conference hub 210 further includes a transmitter 530 configured to send the processed first audio signal to the conference. The processed first audio signal may be transmitted via any suitable medium including, but not limited to, telecommunication network, and computer network such as the Internet or local area network (LAN). Alternatively or additionally, the processed first audio signal may be played back, for example, via a loudspeaker(s).

In some embodiments, the processor 520 may be configured to estimate, based on the second audio signal, an ambient noise in a space where the first user is located; and remove the estimated ambient noise from the first audio signal. In some embodiments, the conference hub 210 may further include a filter (not shown) configured to filter the second audio signal to generate an output audio signal to approximate the ambient noise, the filter being controlled according to an error signal, where the error signal is generated from the first audio signal and the output audio signal.

In some embodiments, the processor 520 may be configured to compare the strength of the first audio signal with the strength of the second audio signal, and to identify the first audio signal based on the second audio signal if the strength of the first audio signal is greater than the strength of the second audio signal. That is, the conference hub 210 may recognize the current dominant speaker and the associated audio signal based on the signal strength.

In some embodiments, the processor 520 may be configured to authenticate the first user device 220, 230 prior to receiving the first audio signal from the first user device 220, 230. For example, in certain embodiments, the conference hub 210 may further include an NFC module configured to receive a NFC signal from the first user device 220, 230. The processor 520 may be configured to obtain an identification of the first user device 220, 230 from the received NFC signal, and to determine whether the first user device 220, 230 is authorized to access the teleconference based on the obtained identification.

In some embodiments, the receiver 510 may be further configured to receive information indicating an acoustic feature of the first user, the acoustic feature being obtained by the first user device 220, 230. In such embodiments, the processor 520 may be configured to process the first audio signal based on the acoustic feature of the first user.

Specifically, as discussed above, the conference may be a teleconference. In such embodiments, the transmitter 530 may be configured to transmit the processed first audio signal to a remote conference hub 210 serving another party in the teleconference.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method comprising:
   establishing, by a computer operating as a teleconference hub, communications with a plurality of portable multifunction devices, in accordance with one or more wireless communication protocols, wherein each of the plurality of portable multifunction devices includes a microphone operated to capture audio signals;
   receiving, by the computer, a first audio signal that is acquired by a first portable multifunction device of the plurality of portable multifunction devices, via its microphone, used by a first user in a teleconference;
   receiving, by the computer, second audio signals that are acquired by other portable multifunction devices of the plurality of portable multifunction devices, via their microphones, used by a other users in the conference;
   determining, by the computer, that the first audio signal represents the audio signal of a dominant speaker among the users in the teleconference;
   performing noise cancellation processing, by the computer, on the first audio signal and the second audio signals to produce an output audio signal that represents the first audio signal with reduced noise; and
   sending, by the computer, the first output audio signal to the conference.

2. The method according to claim 1, wherein performing noise cancellation processing comprises:
   estimating, by the computer, based on the second audio signals, an ambient noise in a space where the first portable multifunction device is located; and
   removing, by the computer, the estimated ambient noise from the first output audio signal.

3. The method according to claim 2, wherein estimating, by the computer, the ambient noise further comprises:
   filtering, by the computer, the second audio signals to generate a second output audio signal as an approximation of the ambient noise, the filtering of the second audio signals being controlled according to an error signal, the error signal generated from the first audio signal and the second output audio signal.

4. The method according to claim 1, wherein determining that the first audio signal represents the audio signal of a dominant speaker comprises:
   comparing, by the computer, a strength of the first audio signal with a strength of the second audio signals; and
   determining that the first audio signal represents the audio signal of the dominant speaker if the strength of the first audio signal is greater than the strength of the second audio signal.

5. The method according to claim 1, further comprising:
authenticating, by the computer, the first portable multifunction user device prior to receiving the first audio signal from the first portable multifunction user device.

6. The method according to claim 5, wherein authenticating, by the computer, the first portable multifunction user device further comprises:
receiving, by the computer, a near field communication (NFC) signal from the first portable multifunction user device;
obtaining, by the computer, an identification of the first portable multifunction user device from the received NFC signal; and
determining, by the computer, that the first portable multifunction user device is authorized to access the conference, based on the obtained identification.

7. The method according to claim 1, further comprising:
receiving, by the computer, information indicating an acoustic feature of the first user, the acoustic feature being obtained by the first portable multifunction user device; and
processing, by the computer, the first audio signal based on the acoustic feature of the first user.

8. The method according to claim 1, wherein sending, by the computer, the first output audio signal to the conference further comprises:
transmitting, by the computer, the first output audio signal to a remote teleconference hub computer.

9. A computer program product, the computer program product comprising one or more non-transitory computer readable storage medium and program instructions stored on at least one of the one or more non-transitory computer readable storage medium, the program instructions comprising:
program instructions to establish, by a computer operating as a teleconference hub, communications with a plurality of portable multifunction devices, in accordance with one or more wireless communication protocols, wherein each of the plurality of portable multifunction devices includes a microphone operated to capture audio signals;
program instructions to receive, by the computer, a first audio signal that is acquired by a first portable multifunction device of the plurality of portable multifunction devices, via its microphone, used by a first user in a teleconference;
program instructions to receive, by the computer, second audio signals that are acquired by other portable multifunction devices of the plurality of portable multifunction devices, via their microphones, used by other users in the conference;
program instructions to determine, by the computer, that the first audio signal represents the audio signal of a dominant speaker among the users in the teleconference;
program instructions to perform noise cancellation processing, by the computer, on the first audio signal and the second audio signals to produce an output audio signal that represents the first audio signal with reduced noise; and
program instructions to send, by the computer, the output audio signal to the conference.

10. The computer program product according to claim 9, wherein program instructions to perform noise cancellation processing comprise:
program instructions to estimate, by the computer, based on the second audio signals, an ambient noise in a space where the first portable multifunction device is located; and
program instructions to remove, by the computer, the estimated ambient noise from the first audio signal.

11. The computer program product according to claim 10, wherein program instructions to estimate, by the computer, the ambient noise further comprises:
program instructions to filter, by the computer, the second audio signals to generate a second output audio signal as an approximation of the ambient noise, the program instructions to filter the second audio signals being controlled according to an error signal, the error signal generated from the first audio signal and the second output audio signal.

12. The computer program product according to claim 9, further comprising:
program instructions to receive, by the computer, a near field communication (NFC) signal from the first portable multifunction user device;
program instructions to obtain, by the computer, an identification of the first portable multifunction user device from the received NFC signal; and
program instructions to determine, by the computer, that the first portable multifunction user device is authorized to access the conference, based on the obtained identification.

13. A computer system operating as a teleconference hub, the computer system comprising one or more receivers, one or more transmitters, one or more processors, one or more non-transitory computer readable memories, one or more non-transitory computer readable storage medium, and program instructions stored on at least one of the one or more non-transitory storage medium for execution by at least one of the one or more processors via at least one of the one or more non-transitory computer readable memories, the program instructions comprising:
program instructions to establish, by a computer operating as a teleconference hub, communications with a plurality of portable multifunction devices, in accordance with one or more wireless communication protocols, wherein each of the plurality of portable multifunction devices includes a microphone operated to capture audio signals;
program instructions to receive, by the computer, a first audio signal that is acquired by a first portable multifunction device of the plurality of portable multifunction devices, via its microphone, used by a first user in a teleconference;
program instructions to receive, by the computer, second audio signals that are acquired by other portable multifunction devices of the plurality of portable multifunction devices, via their microphones, used by other users in the conference;
program instructions to determine, by the computer, that the first audio signal represents the audio signal of a dominant speaker among the users in the teleconference;
program instructions to perform noise cancellation processing, by the computer, on the first audio signal and the second audio signals to produce an output audio signal that represents the first audio signal with reduced noise; and
program instructions to send, by the computer, the output audio signal to the conference.

14. The computer system according to claim 13, wherein program instructions to performing noise cancellation processing comprise:
  program instructions to estimate, by the computer, based on the second audio signals, an ambient noise in a space where the first portable multifunction is located; and
  program instructions to remove, by the computer, the estimated ambient noise from the first audio signal.

15. The computer system according to claim 14, wherein program instructions to estimate, by the computer, the ambient noise further comprises:
  program instructions to filter, by the computer, the second audio signals to generate a second output audio signal as an approximation of the ambient noise, the program instructions to filter the second audio signals being controlled according to an error signal, the error signal generated from the first audio signal and the second output audio signal.

16. The computer system according to claim 13, wherein program instructions to determine that the first audio signal represents the audio signal of a dominant speaker comprise:
  program instructions to compare, by the computer, a strength of the first audio signal with a strength of the second audio signals; and
  program instructions to determine that the first audio signal represents the audio signal of the dominant speaker if the strength of the first audio signal is greater than the strength of the second audio signal.

17. The computer system according to claim 13, further comprising:
  program instructions to authenticate, by the computer, the first portable multifunction user device prior to receiving the first audio signal from the first portable multifunction user device.

18. The computer system according to claim 17, wherein program instructions to authenticate, by the computer, the first portable multifunction user device further comprises:
  program instructions to receive, by the computer, a near field communication (NFC) signal from the first portable multifunction user device;
  program instructions to obtain, by the computer, an identification of the first portable multifunction user device from the received NFC signal; and
  program instructions to determine, by the computer, whether the first portable multifunction user device is authorized to access the conference, based on the obtained identification.

19. The computer system according to claim 13, further comprising:
  program instructions to receive, by the computer, information indicating an acoustic feature of the first user, the acoustic feature being obtained by the first portable multifunction user device; and
  program instructions to process, by the computer, the first audio signal based on the acoustic feature of the first user.

20. The computer system according to claim 13, wherein program instructions to send, by the computer, the first output audio signal to the conference further comprises:
  program instructions to transmit, by the computer, the first output audio signal to a remote conference hub computer.

* * * * *